Re. 24404

April 23, 1957     E. X. SCHMIDT     2,789,432
APPARATUS FOR ELIMINATING CERTAIN SYSTEMATIC
ERRORS IN CONTINUOUS FLOW CALORIMETERS Filed Dec. 7, 1953                                       3 Sheets—Sheet 1

Inventor
Edwin X. Schmidt
By W. E. Lyon
Attorney

April 23, 1957 — E. X. SCHMIDT — 2,789,432
APPARATUS FOR ELIMINATING CERTAIN SYSTEMATIC ERRORS IN CONTINUOUS FLOW CALORIMETERS
Filed Dec. 7, 1953 — 3 Sheets-Sheet 2
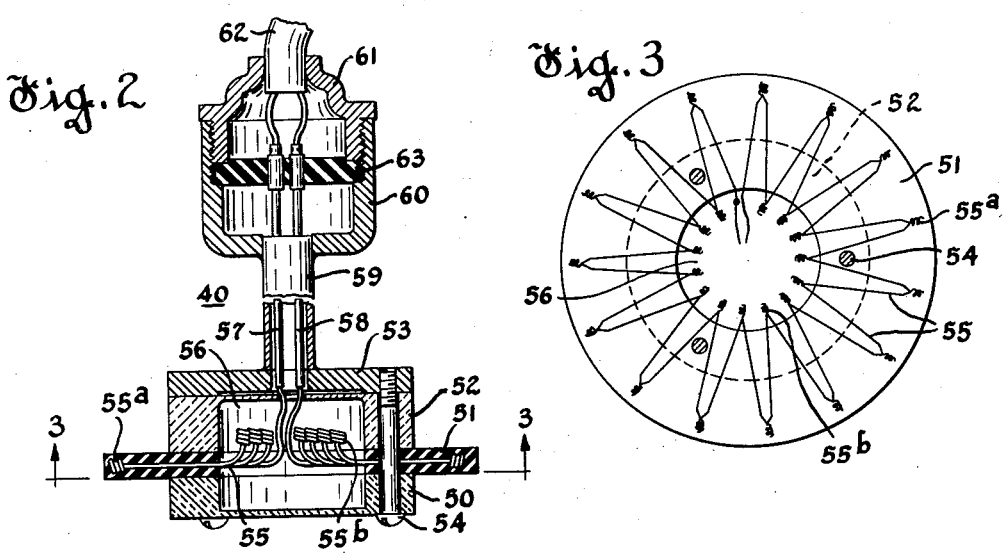
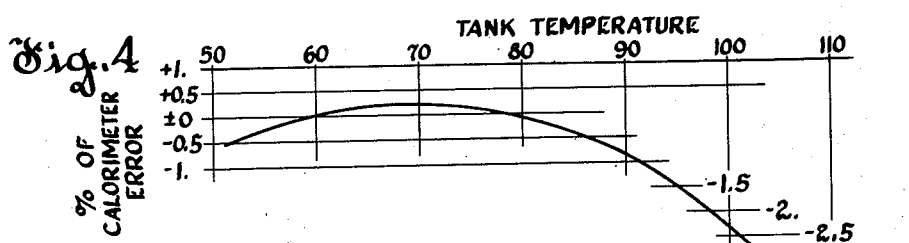
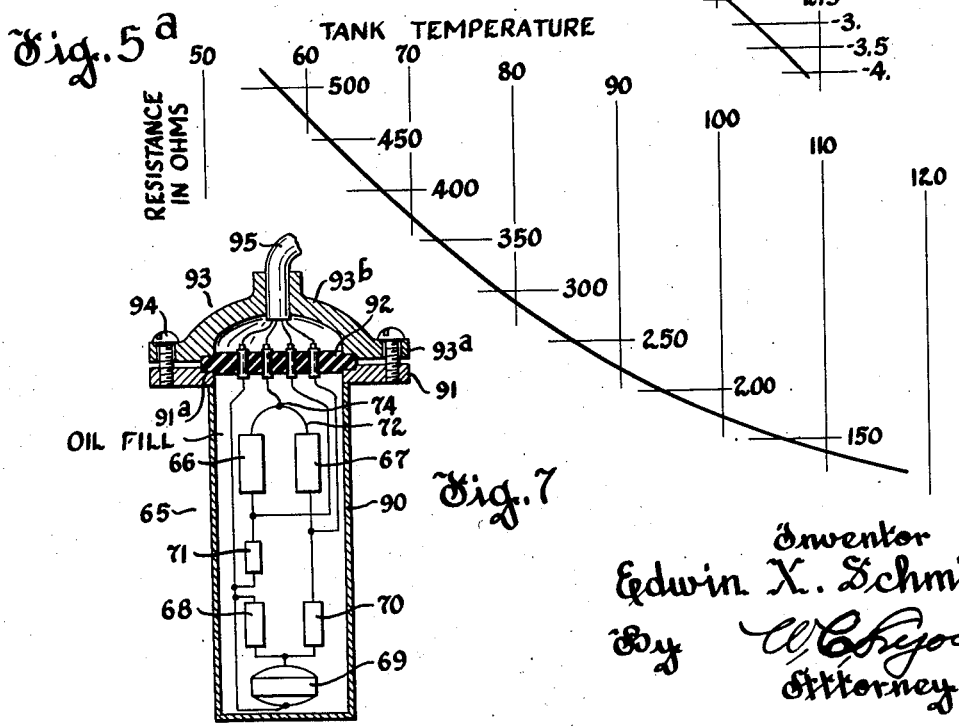
Inventor
Edwin X. Schmidt
By [signature]
Attorney April 23, 1957 E. X. SCHMIDT 2,789,432
APPARATUS FOR ELIMINATING CERTAIN SYSTEMATIC
ERRORS IN CONTINUOUS FLOW CALORIMETERS
Filed Dec. 7, 1953 3 Sheets-Sheet 3
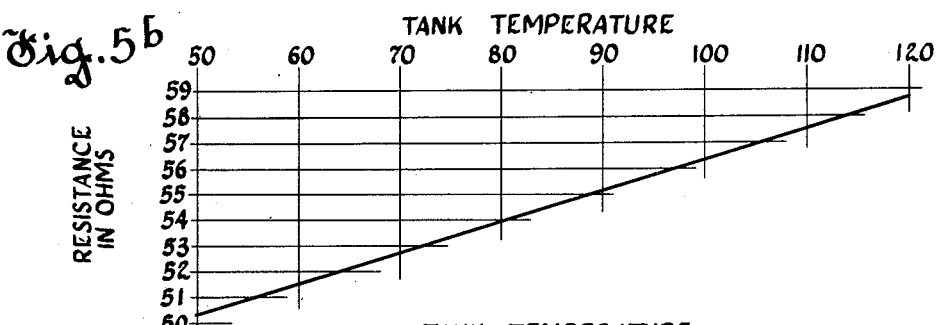
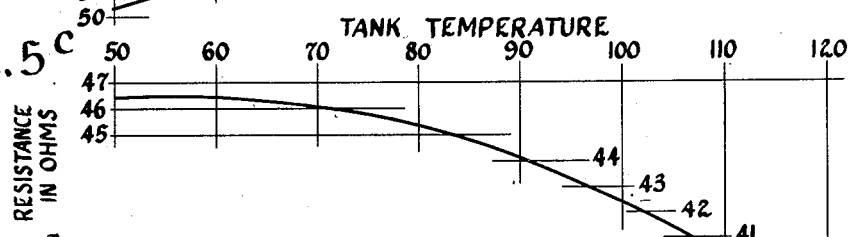
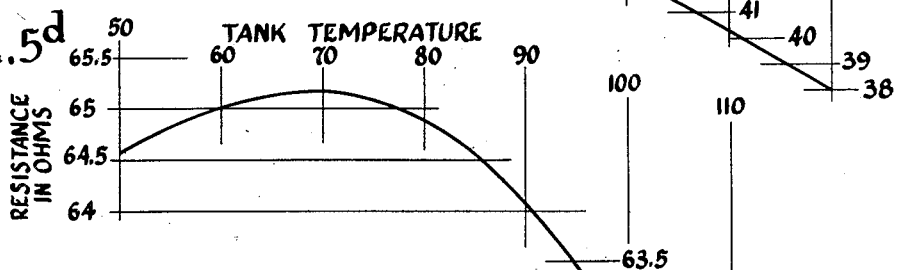
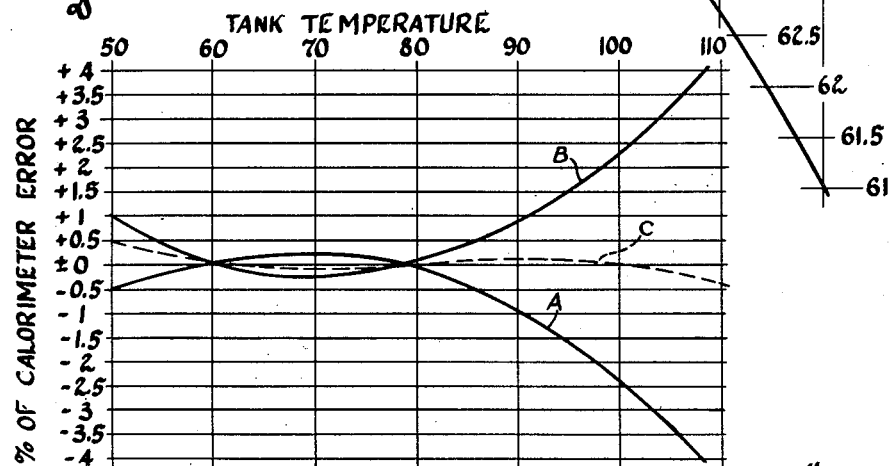
Inventor
Edwin X. Schmidt
By W. E. Lyon
Attorney

United States Patent Office 2,789,432
Patented Apr. 23, 1957

2,789,432

APPARATUS FOR ELIMINATING CERTAIN SYSTEMATIC ERRORS IN CONTINUOUS FLOW CALORIMETERS

Edwin X. Schmidt, Nashotah, Wis., assignor to Cutler-Hammer, Inc., Milwaukee, Wis., a corporation of Delaware Application December 7, 1953, Serial No. 396,700

6 Claims. (Cl. 73—190)

This invention relates to continuous flow calorimeters, and more particularly to means for eliminating certain systematic errors thereof.

While not limited thereto this invention is particularly suitable for use with continuous flow gas calorimeters of the type disclosed in the Packard Patent No. 1,625,277.

The indication and recording of heating value provided by calorimeters of the Packard type is subjected to two systematic errors, both of which affect the temperature rise in the heat absorbing medium. One such error is a function of rate of change in the calorimeter water tank temperature, which stems from changes in ambient temperature, relative humidity and barometric pressure conditions. While changes in such ambient conditions are not ordinarily of such magnitude as to cause high rates of change in tank temperature, tests have shown that when the rate of change in tank temperature approaches 3° F. per hour, objectional error in the measurement of heating value occurs. Rates of change of tank temperature of this magnitude are reflected in appreciable temperature lags between entrance and exit resistance thermometers of the electrical measuring circuit.

The other of such errors is a characteristic error associated with tank temperature. The error is primarily due to variations in water vapor content of the heat absorbing air and of the test gas. The normal error due to water vapor variation is partially reduced by the resistance characteristic of the entrance and exit resistance thermometers, so that over a range of tank temperatures from 60° to 85° F. the error is relatively small. However, with tank temperatures outside this range, and particularly above it, such error becomes significant.

It is accordingly the object of the present invention to provide means for substantially eliminating the aforementioned systematic errors, and thereby afforded greater accuracy in the measurement, and hence in the indication and recording of heating values in continuous flow calorimeters.

In carrying out the invention, I provide for substantially eliminating the error which is a function of rate of change in tank temperature by injecting a D. C. potential into the galvanometer measuring circuit whose magnitude is proportional to such error, and of a polarity such that it will offset such error. I also provide for substantial eliminating of the normal error associated with tank temperature over the normal operating range of tank temperatures by injecting a second D. C. potential in the galvanometer measuring circuit whose magnitude is proportional to the error at the different tank temperatures, and of such polarity that such error will be offset.

Other objects and advantages of the invention will hereinafter appear.

The accompanying drawings illustrate certain preferred embodiments of the invention which will now be described, it being understood that the embodiments illustrated are susceptible of modifications in respect of details without departing from the scope of the appended claims.

In the drawings:

Fig. 2 is an elevational view, partially in section, of a preferred form for a device utilized in the system of Fig. 1 for eliminating error due to rate of change in tank temperature.

Fig. 3 is a sectional view taken substantially along the line 3—3 of Fig. 2.

Fig. 4 is a graph depicting the normal calorimeter error variation with tank temperature.

Figure 1:
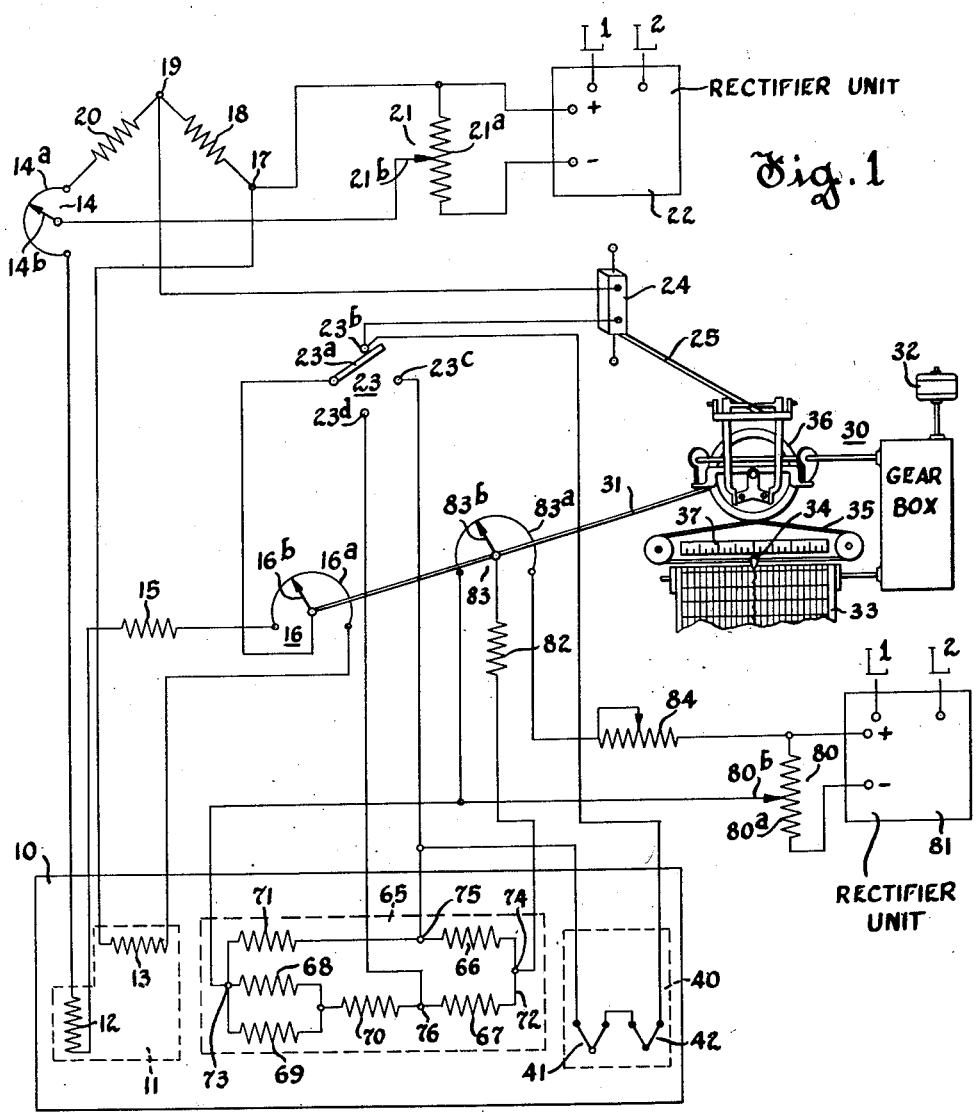
Figure 1 illustrates schematically and diagrammatically a calorimetric measuring system incorporating the invention.

Figs. $5^a$, $5^b$, $5^c$ and $5^d$ graphically illustrate the resistance vs. temperature characters of certain resistance elements, and combinations thereof, in a normal calorimeter error compensating device used in the system of Fig. 1.

Fig. 6 is a graphical comparison of the error depicted in Fig. 4, the compensation afforded by the normal calorimeter error compensating device, and the resulting compensated error, and Fig. 7 is a view in vertical cross section of a preferred form for a normal calorimeter error compensating device.

Referring to Fig. 1, the numeral 10 designates a calorimeter water tank in which is mounted a test burner assembly, generally indicated 11, and having associated therewith an entrance resistance thermometer 12 and an exit resistance thermometer 13. Thermometer 12 is connected at one end to the lower end of a resistance element $14^a$ of an adjustable voltage divider 14, and is connected at its other end in series with a resistor 15 to a resistance element $16^a$ of a potentiometer 16, and thermometer 13 to a junction 17. A resistance element 18 is connected between junction 17 and a junction 19, and a similar resistance element 20 is connected between junction 19 and the other end of resistance element $14^a$ of voltage divider 14. As will be apparent, the elements thus far described comprise a conventional Wheatstone bridge circuit, in which resistance element $14^a$ from slider $14^b$ to the lower end thereof, plus thermometer 12, resistor 15 and resistance element $16^a$ of potentiometer 16 from its left-hand end to slider $16^b$ constitute one leg, the right-hand portion of resistance element $16^a$ plus exit thermometer 13 constitutes a second leg, resistance element 18 a third leg, and resistance element 20 plus the upper portion of resistance element $14^a$ of voltage divider 14 the fourth leg. Slider $14^b$ of voltage divider 14 is connected to the adjustable tap $21^b$ of a potentiometer 21, and the junction 17 is connected to one end of resistance element $21^a$ of potentiometer 21 and the latter is in turn connected across the D. C. output terminal of a rectified A. C. supply source 22. Potentiometer 21 and source 22, provide an adjustable D. C. voltage for the aforementioned Wheatstone bridge circuit.

A three-position switch 23, having a movable contactor $23^a$ and stationary contacts $23^b$, $23^c$ and $23^d$, in the operating position shown with contactor $23^a$ engaging contact $23^b$, connects a galvanometer coil 24 between slider $16^b$ of potentiometer 16 and junction 19. A needle 25 associated with and movable in accordance with the extent and direction of deflection of galvanometer coil 24 is utilized in connection with a well known form of control mechanism to effect automatic re-balancing of the bridge circuit. Such control mechanism is generally indicated at 30 and is of the type disclosed in the Leeds Patent 1,125,699. Thus, the deflection of coil 24 and needle 25 controls the direction and extent of rotation of a shaft 31 which acts to move slider $16^b$ on resistance element $16^a$ to equalize the resistance values of the legs of the bridge circuit containing the respective resistor thermometers 12 and 13, whereby the bridge circuit is balanced automatically during testing of the heating value of combustible gas in burner 11. In other words, the deflecting system of the galvanometer controls a disengageable mechanical connection between an electric motor 32 and shaft 31 whose direction and extent of movement depend upon the direction and extent of deflection of the needle 25. A recording chart or sheet 33 is advanced at a constant rate by motor 32 past the marker or pen 34 which is moved transversely of the record sheet by a flexible connection 35 between the same and a disk 36 which carries shaft 31. A portion of the pen 34 coacts with a suitable calibrated stationary scale 37 to indicate directly the instantaneous total heating value per unit volume of the combustible gas or fluid being tested.

The portion of the system of Fig. 1 thus far described is a conventional indicating and recording heating value measuring system for continuous flow calorimeters of the Packard type, and without the compensating means hereinafter to be fully described, would be subject to both the system errors hereinbefore described.

In order to compensate for the errors due to rate in change in tank temperature, I provide a compensator unit 40, which in Fig. 1 is schematically depicted by the broken-line rectangle within tank 10, and as comprising a single thermocouple with junctions 41 and 42. As will be more fully described in connection with Figs. 2 and 3, unit 40 comprises a thermopile consisting of one set of junctions (depicted by junction 41) which are arranged to respond quickly to changes in tank temperature, and another set of junctions (depicted by junction 42) which are arranged to respond relatively slowly to changes in tank temperature. As shown in Fig. 1, junction 41 is connected at one end to stationary contact 23ᶜ of switch 23 and at its other end to one end of junction 42. Junction 42 is connected at its other end in series with galvanometer coil 24, through contact 23ᵇ, to junction 19.

Let it be assumed that with switch in the operating position shown in Fig. 1 that the Wheatstone bridge circuit is so balanced that there is zero current flow through galvanometer coil 24. If contactor 23ᵃ is then moved to engage with contact 23ᶜ, junctions 41 and 42 will then be included in series with galvanometer coil 24. With zero rate of change in tank temperature junction 41 and 42 will be at the same temperature and no potential will exist across contacts 23ᵇ and 23ᶜ. However, with a changing tank temperature, the temperature of junction 42 will lag behind the temperature of junction 41, and consequently a voltage proportional to the temperature difference will be established across contacts 23ᵇ and 23ᶜ. Thus, with the temperature of the tank changing at a given rate, re-establishment of zero current flow through galvanometer coil 24 requires that slider 16ᵇ of potentiometer 16 be shifted on resistance element 16ᵃ in such direction and amount that the voltage between slider 16ᵇ and junction 19 is equal and opposite to that across contacts 23ᵇ and 23ᶜ.

Assuming that the voltage drop per unit of length of resistance element 16ᵃ is constant, a given voltage across contacts 23ᵇ and 23ᶜ will cause movement of slider 16ᵇ an amount proportional to the ratio of the voltage across contacts 23ᵇ and 23ᶜ to the voltage supplied to the bridge circuit by potentiometer 21 and source 22. Thus, assuming potentiometer 21 is adjusted to apply 1.5 volts across slider 14ᵇ and junction 17, that the combined resistance of thermometers 12 and 13 is 110 ohms, that the resistance of element 16ᵃ is 2.75 ohms, and that the resistance of resistor 15 plus the portion of resistance element 14ᶜ from slider 14ᵇ to the lower end of such element is also 2.75 ohms, the current flow through resistance element 16ᵃ would equal 1.5/11.5, or 0.0135 amp. The voltage drop for 1% of full length of resistance element 16ᵃ would thus equal $(0.0135) \times (0.01) \times (2.75)$, or 0.00037 volt. Accordingly, subjecting galvanometer coil 24 to a potential of 0.00037 volt would cause a shift in position of slider 16ᵇ on element 16ᵃ by an amount equal to 1% of its full travel, and the direction of such shift would depend upon the relative polarity of the two sources of voltage.

Tests indicate that with a Packard type of calorimeter the error shift of tap 16ᵇ on resistance element 16ᵃ due to rate in change of tank temperature is 0.2% of full scale travel per 1° F. per hour rate of change in such temperature. The time constant for the burner structure in such a calorimeter is approximately 7 minutes, so that if the tank temperature is increasing at the rate of 3° F. per hour, the temperature of exit thermometer 13 lags approximately 0.25° F. behind that of entrance thermometer 12. With contactor 23ᵃ of switch 23 engaging contact 23ᵇ, slider 16ᵇ would be caused to move 0.6% of full scale travel to the left of normal position of the same for zero rate of change in tank temperature. This same shift would occur both on cold balance test and also on actual runs on gases. By switching contactor 23ᵃ to contact 23ᶜ and applying a voltage across contacts 23ᵇ and 23ᶜ equal to $0.6 \times 0.00037$, or 0.22 millivolt. With proper polarity, slider 16ᵃ would then move up 0.6% of full scale travel to its normal balance position at zero rate of change in tank temperature, at which position thereof zero current flow through galvanometer coil 24 would be established.

Theoretically compensator unit 40 preferably would be designed to have the same time constant as the calorimeter burner structure, which is approximately seven minutes. However, this would require that the thermopile be made up of a relatively large number of thermocouples in series to obtain the necessary compensating voltage when the tank temperature changes at the rate of 3° F. per hour. One iron-constantan thermocouple develops approximately 0.028 millivolt per degree F. difference in temperature between its junctions. Thus, with a burner structure time constant of seven minutes and a 3° F. per hour rate of change in tank temperature, the temperature difference between slow and fast junctions would be 0.25° F. per thermocouple and the voltage generated thereby would be 0.007 millivolt. To obtain the desired compensating voltage of 0.22 millivolt approximately 0.22/0.007, or thirty-one thermocouples in series would be required. However, in practice it is possible to make a satisfactory compensator with fewer thermocouples by increasing the time constant of such unit.

Figs. 2 and 3 show a preferred form for compensator unit 40. It comprises a lower hollow housing member 50, an annular disc 51, an intermediate hollow housing member 52 and an upper cover plate 53 which are secured together as by screws 54 penetrating alined openings in members 50 and 52 and disc 51, and taking into threaded recesses in plate 53. Members 50 and 52 are preferably formed of a low heat conducting material and disc 51 of a thin section of dielectric plastic material in which one set of corresponding junctions 55ᵃ of some fifteen or more series connected iron-constantan thermocouples 55 are embedded adjacent the outer periphery of the disc. The other set of corresponding junctions 55ᵇ of the thermocouples lie within the hollow cavity 56 formed by members 50 and 52 and disc 51. Wire leads 57 and 58 connecting with junctions 55ᵃ and 55ᵇ, respectively extend through a central opening in cover plate 53, which is preferably formed of brass, and up through a tubular brass conduit 59, secured to plate 53, into an upper terminal housing member 60, also preferably made of brass. Member 60 is internally threaded, and a cap 61, having a central aperture, through which projects a water-proof cable 62 in fluid-sealed relation is adapted to take down therein against a washer 63 formed of compressible insulating material to seal said housing against entrance of water. Cable 62 is provided with wire leads having male connectors which plug into female connectors in washer 63, to which leads 57 and 58 are connected.

Compensator unit 40 would be, except for the upper end of conduit 59 and its upper terminal housing, submerged in the calorimeter tank water to be subjected to changes in temperature thereof. When the tank temperature remains constant junctions 55a and 55b assume the same temperature and the output voltage of unit 40 would be zero. With a change in tank temperature it will be apparent that the junctions 55a will respond quickly to changes in tank temperature while the junctions 55b will lag behind, and thus the thermopile will produce a voltage proportional to the rate of change in tank temperature, and the polarity of such voltage will depend on the direction of such changes in temperature. The time constant of the unit can be changed by changing the volume of cavity 56, or by making other changes in the housing structure. If fifteen thermocouples, as shown, are used, the time constant of the unit will necessarily have to be longer than the seven minute time constant of the calorimeter burner structure.

The curve of Fig. 4 depicts the normal error variation with tank temperature of a Packard type of calorimeter in percent of actual reading. To find the error in percent of full scale reading such error should be multiplied by the ratio of the actual reading to the full scale reading. As part of the present invention, I provide a compensator unit 65 which substantially eliminates the error depicted in Fig. 4 by introducing an additional compensating voltage in the galvanometer coil circuit of Fig. 1. Compensator unit 65 comprises a network of resistance elements, as shown schematically in Fig. 1 and in a preferred form in Fig. 7.

More particularly, the resistance network of unit 65 comprises resistors 66, 67, 68, 69, 70 and 71, resistor wire 72, input terminals 73 and 74, and output terminals 75 and 76 arranged as depicted in Figs. 1 and 7. As shown in Fig. 1, input terminal 73 is connected to slider 80b of a potentiometer 80 which has its resistance element 80a connected across the D. C. output terminals of a rectified A. C. supply source 81. Input terminal 74 is connected in series with a resistor 82 to slider 83b of a potentiometer 83 having a resistance element 83a. Resistance element 83a is connected at its left-hand end to slider 80b of potentiometer 80, and at its right-hand end in series with an adjustable resistor 84 to an end of resistance element 80a of potentiometer 80. Output terminal 75 of unit 65 is connected to contact 23c of switch 23, and output terminal 76 is connected to contact 23d of switch 23.

If contactor 23a of switch 23 is shifted to engage contact 23d, the output voltage of compensator unit 65 is inserted in the circuit of galvanometer coil 24 in addition to the voltage supplied to such circuit by compensator unit 40. The selector of resistance values and materials for the network of compensator 65 will now be described in detail.

Resistors 66, 67 and 71 are made of a zero resistance coefficient material, as in connecting wire 72 between resistors 66 and 67. Resistor 69 is made of a negative resistance coefficient material, and resistors 68 and 70 are made of positive resistance coefficient material.

The negative temperature coefficient material, known under the commercial trade name of "Thermistor" and varying in total resistance in accordance with the curve of Fig. 5a has been found suitable for resistor 69. Experience has shown that by measuring the resistance of resistor 69 at 60° F. and making resistor 68 of nickel wire with a resistance value at this same temperature of 11% of that value, a parallel combination is provided, which with the addition of series resistor 70 made from nickel wire of suitable resistance value, will produce a resistance characteristic which is similar to the accuracy charactertisic of the Packard type calorimeter. Fig. 5b depicts the resistance vs. temperature relation of a nickel wire material suitable for resistor 68. Fig. 5c depicts the resistance vs. temperature relation provided by resistors 68 and 69 in parallel. Selection of resistor 70 consists in calibrating the parallel combination of resistors 68 and 69 at two temperatures close to temperatures at which the normal calorimeter error is zero, and providing a resistance value for resistor 70, which when added in series with the parallel combination of resistors 68 and 69, will produce the same total resistance at the two temperatures where the normal calorimeter error is zero. Fig. 5d depicts the resistance vs. temperature relation of resistors 68, 69 and 70 in combination. Resistor 71 is then preferably made up from manganin wire to have this same resistance value. Resistors 66 and 67, and connecting wire 72 are preferably made up from the same piece of manganin wire. Each of the resistors 66 and 67 preferably has a resistance value of approximately 30% of the resistance of resistor 71. The position of terminal 74 on wire 72 is preferably determined, and permanently fixed, after subjecting unit 65 to a temperature of 60° F., connecting a galvanometer across terminals 75 and 76, applying a voltage across terminal 41 and moving the lead from resistor 82 on wire 72 until zero galvanometer deflection is obtained.

Slider 80b of potentiometer 80 is adjusted for approximately 1.5 volt output, and resistance element 83a of potentiometer 83 is subjected to this voltage. Slider 83b, mechanically coupled to shaft 31 and moved in correspondence with the movement of slider 16a of potentiometer 16, forms part of a branch circuit including resistor 82 and the resistor network of compensator unit 65. With slider 83b at its left-hand extreme position (recorder pen and pointer 34 at zero), current flow through the branch circuit will be zero and the voltage across terminals 75 and 76 of unit 65 will be zero, regardless of the temperature to which unit 65 is subjected. With slider 83b at its right-hand extreme position (pen and pointer 34 at full scale) the total adjusted output voltage of potentiometer 80 will be applied to the aforementioned branch circuit.

Resistance element 83a of potentiometer 83 preferably has a low resistance value, of approximately 50 ohms or less, and the resistance of the aforementioned branch circuit should be relatively high, 400 ohms or more, so that the voltage applied across terminals 73 and 74 of compensator unit 65 will be approximately proportional to the ratio of portion of resistance of resistance element 83a from its left-hand extreme end to slider 83b, divided by the total resistance of resistance element 83a. Adjustable resistor 84 should be adjusted so that with compensator unit 65 subjected to a temperature of 100° F. and slider 83b of potentiometer 83 at its right-hand extreme position, the voltage output across terminals 75 and 76 of compensator 65 will just offset the calorimeter error at the temperature of 100° F., which is the maximum tank temperature at which the calorimeter will normally be expected to operate.

In Fig. 6, curve A depicts the normal calorimeter error, shown in Fig. 4, curve B depicts the offsetting compensation afforded by compensator unit 65, and curve C the resulting compensated error. As seen from curve C, over the range from 55° to 100° F., the normal error of the calorimeter due to tank temperature is substantially eliminated. Due to inability to exactly obtain the desired resistance characteristic of the various resistors in unit 65, establishing the desired compensation at 100° F. does not necessarily assure the exact amount of compensation at other temperatures between 55° and 100° F. Thus, at about 70° F., where the normal error is about +0.25%, there is some tendency for the compensation to afford over compensation of about 0.25%, so that the error is then —0.06% when at 70° F. correct compensation at 100° F. is afforded.

It is desirable that rectified A. C. supply sources 22 and 81 be alike and be connected to the same A. C. supply so that any power supply disturbances will not appreciably disturb the ratio of their output voltages. Batteries could be substituted for sources 22 and 81, if desired.

As shown in Fig. 7, the resistor network of compensator unit 65 is in a preferred form suspended in an oil filled cup member 90, formed of brass, and having secured thereto adjacent its upper end an annular peripheral flange 91. A washer 92, formed of a compressible material and having female connectors therein connecting with the various terminals of the resistor network, seats in an annular recess 91a formed in flange 91 and is adapted to seal the cavity within cup member 90 by means of a flange 93a of a cap member 93, and by screws 94 penetrating openings in flange 93a and taking into threaded recesses or openings formed in flange 91. Cap member 93 is provided with a centrally apertured bell-shaped portion 93b through which projects in fluid-sealed relation, a water-proof conductor 95, comprising a plurality of wire leads with male connectors for plug-in with the connectors in washer 92.

I claim:

1. In a measuring system for combustion calorimetric apparatus which is subject to a systematic error that varies with temperature of an environmental medium in which operation of such apparatus is carried on, the combination with an electrical measuring circuit comprising elements subjected to the temperatures of the unburned and burned gas, respectively, and affording voltages thereacross as a function of such temperatures to change the voltage balance between portions of the circuit in which they are respectively included in accordance with changes in the heating value of the gas, galvanometric means responsive to voltage unbalance between said portions of the circuit and balancing means under the control of said galvanometric means acting to effect rebalance of voltages across said portions, of compensating means comprising means affording a voltage varying in magnitude in accordance with adjustment of said balancing means and means subjected to the influence of the last mentioned voltage and the temperature of said medium to provide a systematic error compensating output voltage, and means for subjecting said galvanometric means to said compensating means output voltage.

2. The combination according to claim 1 wherein the last mentioned means of said compensating means comprises a resistance bridge circuit for subjection to said temperature variation and including as one leg a network of resistors so selected and arranged that the equivalent resistance of such leg varies with temperature substantially in correspondence with the normal calorimeter error variation over the normal operating range of temperatures of said medium.

3. The combination according to claim 1 wherein the last mentioned means of said compensating means comprises a resistance bridge circuit including first and second legs having resistors of equal ohmic value formed of zero coefficient material, a third leg having a first resistor formed of a negative coefficient material, a second resistor in parallel with the first resistor formed of a positive coefficient material and a third resistor in series with first and second resistors formed of a positive coefficient material, said resistors of said third leg being so selected with respect to their relative resistance values that the equivalent resistance of such leg varies with temperature substantially in accordance with variation of the systematic error of the calorimetric apparatus and a fourth leg having a resistance formed of positive coefficient material and equal in ohmic value to the equivalent resistance of said third leg at a predetermined temperature.

4. The combination according to claim 1 wherein the last mentioned means of said compensating means comprises a resistance bridge circuit for subjection to said temperature variation and including as one leg a network of resistors so selected and arranged that the equivalent resistance of such leg varies with temperature substantially in correspondence with the normal calorimeter error variation over the normal operating range of temperatures of said medium, and wherein the first mentioned means of said compensating means includes a source of D. C. voltage, and a rheostat in circuit with said bridge circuit and said source and having a slider positionable in accordance with the adjustment of said balancing means.

5. The combination according to claim 1 together with compensating means for subjection to the temperature changes of said medium providing an output voltage whose magnitude and polarity is a function of rate and direction of change of such temperature, and wherein the galvanometric means is subjected to the algebraic resultant of the output voltage of the last recited compensating means, and the output voltage of the first mentioned compensating means.

6. A compensator unit for calorimetric apparatus including an oil filled, hollow container formed of a high heat conducting material and a resistance bridge circuit suspended in said oil and comprising first and second legs having resistors of equal ohmic value formed of zero coefficient material, a third leg having a first resistor formed of a negative coefficient material, a second resistor in parallel with said first resistor formed of a positive coefficient material and a third resistor in series with said first and second resistors formed of a positive coefficient material, said resistors of said third leg being so selected with respect to their relative resistance values that the equivalent resistance of such leg varies with temperature substantially in accordance with the variation in normal error of the calorimetric apparatus, and a fourth leg having a resistor formed of said positive coefficient material and equal in ohmic value to the equivalent resistance of said third leg at a predetermined temperature.

References Cited in the file of this patent

UNITED STATES PATENTS

| | | |
|---|---|---|
| 1,572,283 | Griswold | Feb. 9, 1926 |
| 2,002,279 | Schmidt | May 21, 1935 |
| 2,141,453 | Schmidt | Dec. 27, 1938 |
| 2,238,606 | Schmidt | Apr. 15, 1941 |